Apr. 3, 1923.

E. G. HINES 1,450,807

TREE HOLDER

Filed Feb. 3, 1922

Inventor
Edwin G. Hines.

By
Lacey & Lacey, Attorneys

Apr. 3, 1923.
E. G. HINES
1,450,807
TREE HOLDER
Filed Feb. 3, 1922
2 sheets-sheet 2
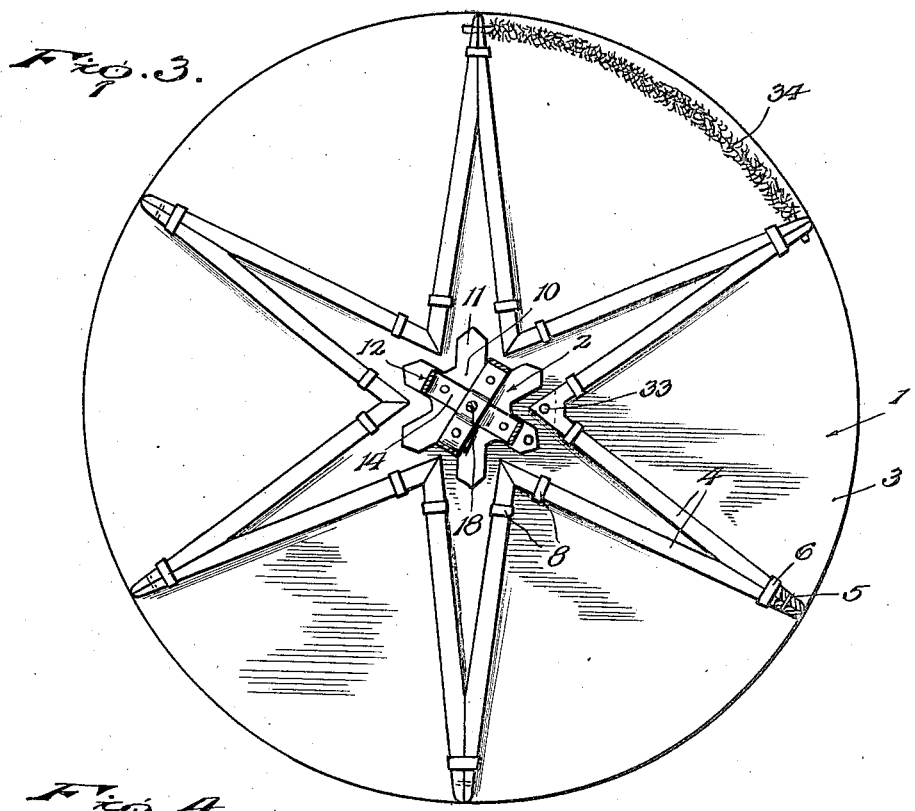
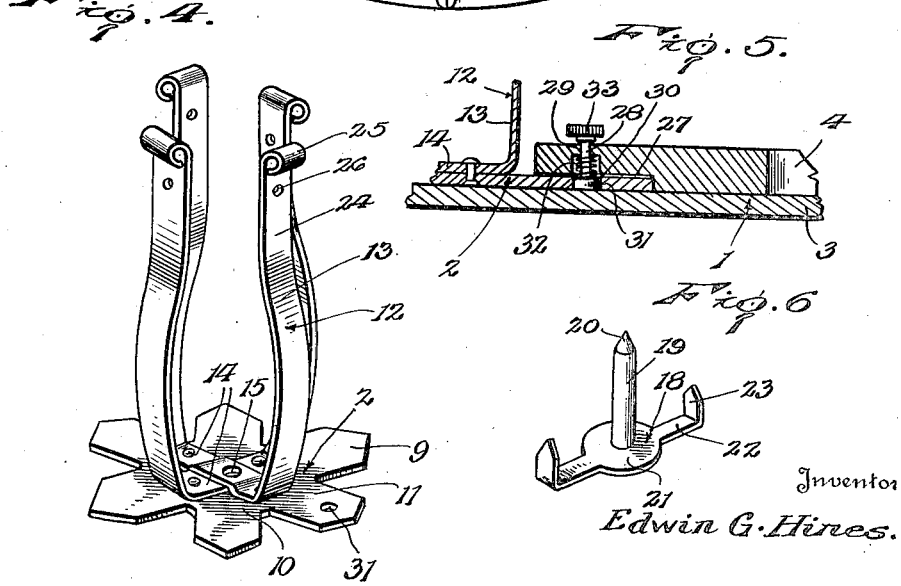
Inventor
Edwin G. Hines.
By Lacy & Lacy, Attorneys Patented Apr. 3, 1923.

1,450,807

UNITED STATES PATENT OFFICE.

EDWIN G. HINES, OF DRUMS, PENNSYLVANIA.

TREE HOLDER.

Application filed February 3, 1922. Serial No. 533,870.

*To all whom it may concern:*

Be it known that I, EDWIN G. HINES, a citizen of the United States, residing at Drums, in the county of Luzerne and State of Pennsylvania, have invented certain new and useful Improvements in Tree Holders, of which the following is a specification.

This invention relates to Christmas tree holders or supports.

One of the primary objects of the present invention is to provide a Christmas tree holder which may be produced at a low cost from inexpensive materials and which while light in weight will constitute a firm and secure support for the tree.

Another object of the invention is to provide a Christmas tree holder embodying a base member of novel construction adapted to securely support the socket member into which the trunk of the tree is fitted and embodying means whereby the socket member may be separably connected with the base member so that the parts may be compactly arranged for the purposes of shipment and likewise may be more conveniently stored away when the device is not in use.

Another object of the invention is to so construct the base member that while it in itself is of a light and inexpensive material, it will be so reinforced as to render it sufficiently substantial to support the tree against overturning and in fact as substantial as base members of a heavier and more expensive construction.

Another object of the invention is to provide the base member of the device with a reinforcing means which will present an ornamental appearance and add materially to the attractiveness of the device as a whole.

The invention also has as one of its objects to so construct the reinforcing means for the base member that it may serve also as an anchoring means for decorations or trimmings of a certain kind as will presently be explained.

Another object of the invention is to provide a novel construction of socket member for the tree trunk adapted to receive trunks of various sizes without any specific adjustment of its parts and adapted to firmly grip and hold the trunk in upright position.

In the accompanying drawings:

Figure 3 is a horizontal sectional view on the line 3—3 of Figure 2;

Figure 4 is a perspective view of the socket member of the device separated from the base member;

Figure 5 is a detail sectional view illustrating the locking means for securing the socket member when assembled with the base; and Figure 6 is a perspective view of the anchoring spur of the socket member removed therefrom.

Figure 1:
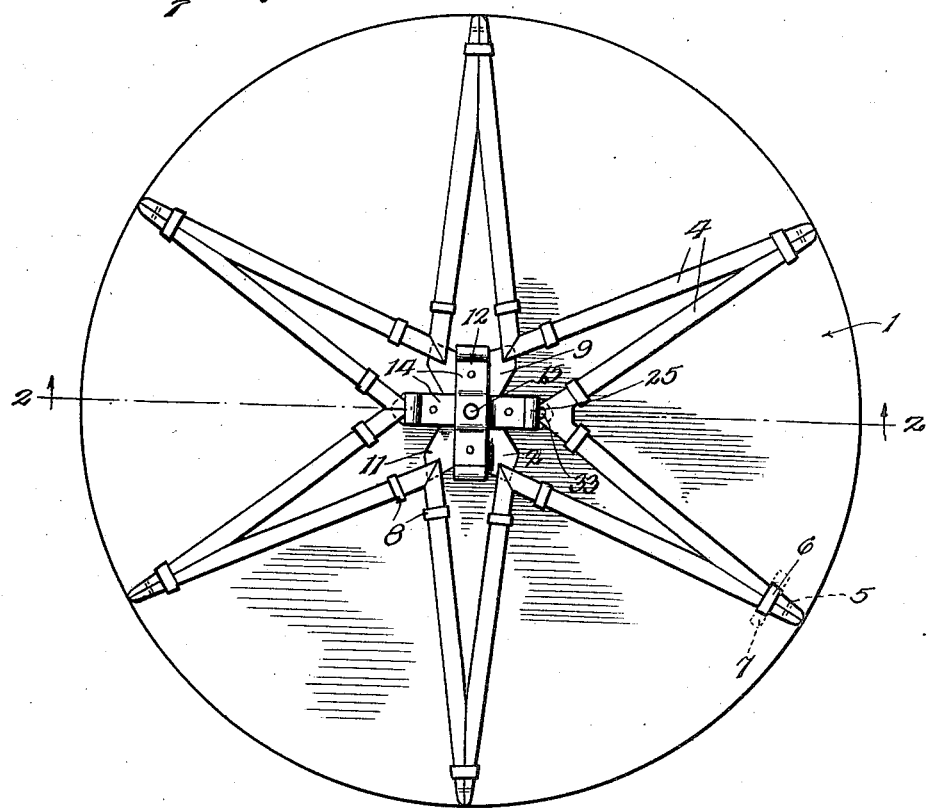
Figure 1 is a plan view of the device embodying the invention.

The device embodying the invention comprises a base member which is indicated in general by the numeral 1 and a socket member indicated in general by the numeral 2. The base member 1 consists in part of a flat body 3 which may be of the circular form shown in the drawings or in any other desired marginal contour and which may be made of any material found suitable for the purpose, as for example of straw board of a suitable thickness. This disk-like body may be colored, silvered, or otherwise ornamented in any other manner found desirable and it will be of a diameter sufficiently great to insure against toppling over of the tree supported by the device. The body 3 is reinforced by pairs of reinforcing members 4 which may be in the nature of strips of wood or any other suitable material, the strips of each pair being arranged in a manner to relatively diverge to a greater or less degree in the direction of the center of the body 3, and the pairs being arranged substantially radial to the said center of the body as clearly shown in Figures 1 and 3 of the drawings. This arrangement of the reinforcing strips serves to impart a more or less ornamental appearance to the base as the arrangement produces a geometric figure resembling a star. The strips 4 of each pair have their outer end portions brought together and secured in any suitable manner as for example by small brads or similar fastening elements 5, and clips 6 are preferably engaged over the joined outer ends of the strips of each pair and have tongues 7 which are inserted through the body 3 of the base 1 and bent flat against the under side of the base. In this manner the outer ends of the reinforcing strips are securely anchored to the base near the periphery of the body thereof, and by the use of similar clips 8 the inner ends of the said strips 4 are likewise anchored or secured to the said body of the base near the center thereof. It will be understood at this point the outer ends of the strips 4 of each pair may be united in any desired manner or they may be secured together solely by the clips 6, and likewise the inner ends of the strips 4 of relatively adjacent pairs may be brought together and mutually united, or held in such assembled relation by the clips 8.

The socket member of the device comprises a base plate 9 having a central portion 10 and radial fingers 11, this plate being preferably formed from sheet metal. The socket member 2 further comprises clip members indicated in general by the numeral 12 and each comprising a pair of clip fingers 13 and a connecting bottom portion 14, the members being assembled with their bottom portions 14 arranged in crossed relation at right angles as illustrated in Figures 1, 3 and 4 of the drawings and riveted or otherwise permanently secured to the central portion 10 of the base plate 9. At the point of intersection in the bottom portions 14 of the gripping members 12 these portions are formed with registering openings 15, and the central portion 10 of the base plate 9 is formed with an opening 16 registering with the openings 15 and with an opening 17 formed in the body 3 of the base member 1.

Figure 2:
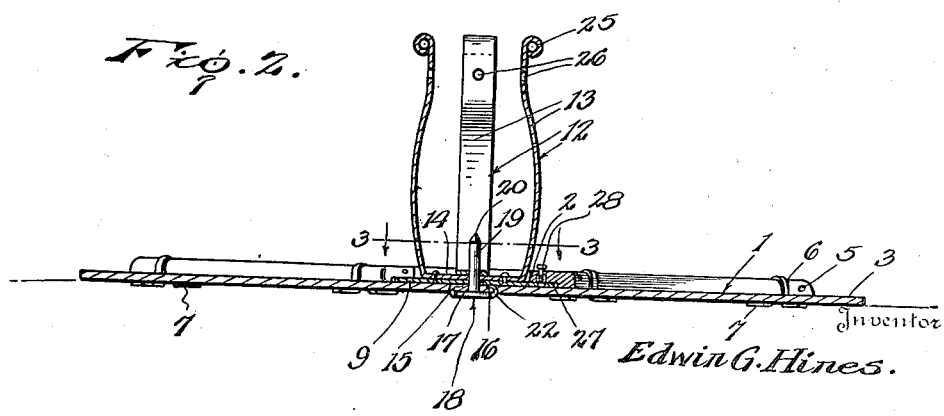
Figure 2 is a diametric sectional view on the line 2—2 of Figure 1 looking in the direction indicated by the arrows.

In Figure 6 of the drawings there is illustrated an anchoring spur for the tree trunk indicated in general by the numeral 18 and comprising a shank 19 having a pointed upper end 20 and provided at its lower end with a head 21 having radial fingers 22 provided with pointed terminal portions 23. The spur member 18 is assembled with the base 1 and socket member 2 by fitting the shank 19 through the registering openings 15, 16 and 17, and is secured in place by causing the terminal portions 23 of the fingers 22 to pierce the body 3 of the base member 1 after which the said terminal portions are bent over as shown in Figure 2 to securely unite the parts. It will now be evident that the shank 19 of the spur member 18 projects upwardly beyond the upper side of the base member centrally of the series of gripping fingers 13 and is adapted to enter the lower end of the tree trunk which is disposed within the socket member. In order to permit of the tree trunk being readily fitted into the socket member and in order that the fingers 13 may firmly bind against the sides of the trunk so as to brace the tree in an upright position, the fingers 13 have their upper portions deflected inwardly as indicated by the numeral 24, and their upper ends are overturned in an outward direction as indicated by the numeral 25 and therefore present rounded surfaces over which the butt end of the trunk may readily pass when the trunk is inserted into the socket member. The inwardly deflected upper end portions 24 of the fingers 13 may be formed with openings 26, if desired, through which tacks, small nails, or other suitable fastening elements may be driven to secure the said portions of the fingers to the tree trunk and thus insure against displacement of the trunk.

The shank 19 of the spur member 18 serve not only as an anchoring element penetrating the lower end of the tree trunk deposited within the socket member, but it also serves as a pivot about which the socket member as a whole may be rotatably adjusted while resting upon the body 3 of the base member 1. It will also be evident that the base portion of the socket member more or less loosely fits the shank 19 of the said spur member 18 so that the socket member may be bodily separated from the base member and similarly assembled therewith. In assembling the parts the socket member will be fitted over the shank of the spur member until the base plate 9 rests upon the upper side of the body 3 of the base member 1 and at such time the outer portions of the radial fingers 11 of the said base plate 9 will project between the inner ends of the reinforcing strips 4 of the several pairs as shown in Figure 3 of the drawings. The under sides of the inner ends of the said strips 4 are recessed as indicated by the numeral 27, and from the position shown in Figure 3 the socket member may be rotated to assume the position shown in Figure 1 in which position the outer ends of the fingers 11 of the base plate 9 will ride into engagement in the recesses 27 and consequently beneath the inner ends of the said reinforcing strips 4. When the parts are so positioned, the socket member will of course be restrained against upward displacement with relation to the base member and therefore cannot become separated therefrom. In order to hold the parts in this position so that when the device is in use there will be no likelihood of accidental rotation of the socket member to clear the ends of the fingers 11 from engagement beneath the inner ends of the reinforcing strips 4, a latch device such as shown in Figure 5 may be provided. Said device comprises a stem 28 slidably engaged in an opening 29 provided at the juncture of the inner ends of two of the strips 4, the stem having at its lower end a head 30 which is designed to enter an opening 31 formed in the outer end portion of one of the fingers 11 of the base plate 9. A spring 32 is fitted onto the stem and bears downwardly against the head 30 so as to yieldably hold the head in engagement in the said opening, and a finger knob 33 is provided at the upper end of the stem whereby the stem may be elevated against the tension of the spring 32 to disengage the head 30 and thus permit rotation of the socket member with relation to the base member and a subsequent complete separation of the parts.

The body 3 of the base member 1 being of straw board or some other material more or less yieldable, and the reinforcing strips 4 for said body being unattached thereto except at the points of location of the clips 6 and 8, the ends of trimming strips such for example as the strip shown in Figure 3 and indicated by the numeral 34 may be inserted beneath the reinforcing strips 4 at any desired point and frictionally retained between said strips and the surface of the body 3.

Having thus described the invention what is claimed as new is:

1. In a tree holder, a base member, reinforcing members on the base member, and a trunk socket detachably mounted on the base member and rotatable into and out of engagement with the reinforcing members.

2. In a tree holder, a base member, reinforcing members on the base member, a trunk socket detachably mounted on the base member and rotatable into and out of engagement with the reinforcing members, and means for locking the socket in engagement with the reinforcing members.

3. In a tree holder, a base member having an upstanding trunk anchoring spur, a trunk socket removably fitted to the spur and detachably connected with the base member, and means upon the base member to engage the socket member in overlapping relation, the socket member being rotatable about the anchoring spur into or out of engagement with said means.

4. In a tree holder, a base member, a trunk anchoring spur projecting upwardly therefrom, a trunk socket removably and rotatably fitted to the spur, means upon the base member for engaging the said socket in one position of the same, and a latch associated with said means to lock the socket in engagement therewith.

5. In a tree holder, a base member, a trunk anchoring spur projecting upwardly from the base member, a socket member removably fitted upon the spur, the socket having a locking finger, and means upon the base member to engage over the said finger, the socket being rotatable to move the finger into or out of such engagement.

6. In a tree holder, a base member, reinforcing devices for the base member upon the upper side thereof extending substantially radially to the center of the same, the portions of the reinforcing devices adjacent the center of the base being recessed in their under sides, and a trunk socket disposed upon the said base and having projecting portions engageable beneath the recessed portions of the reinforcing devices whereby to anchor the socket member upon the said body of the base.

7. In a tree holder, a base member, reinforcing strips disposed upon the upper side of the base member substantially radial to the center thereof, clips engaged over said strips and having terminal tongues anchored through the base member, and a socket removably supported upon the base member at the center thereof, the said socket having projecting portions and being rotatable to engage said projecting portions beneath the inner ends of the said reinforcing strips whereby to anchor the socket upon the base member.

8. A tree holder comprising a base member including a disk-like body, reinforcing strips secured upon the upper side of the body and arranged in pairs disposed substantially radial to the central portion of the body, a trunk socket removably resting upon the body at its said central portion, the said socket being provided with radial fingers, the socket being rotatable whereby to position the fingers to extend between the inner ends of the reinforcing strips of the pairs or to engage beneath the said inner ends of the said reinforcing strips whereby to secure the socket upon the body.

In testimony whereof I affix my signature.

EDWIN G. HINES. [L. S.]